(12) United States Patent
Ueno et al.

(10) Patent No.: US 6,898,630 B2
(45) Date of Patent: May 24, 2005

(54) NETWORK MANAGEMENT SYSTEM UTILIZING NOTIFICATION BETWEEN FAULT MANAGER FOR PACKET SWITCHING NODES OF THE HIGHER-ORDER NETWORK LAYER AND FAULT MANAGER FOR LINK OFFERING NODES OF THE LOWER-ORDER NETWORK LAYER

(75) Inventors: Hitoshi Ueno, Kawasaki (JP); Kohei Iseda, Kawasaki (JP); Kenichi Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 766 days.

(21) Appl. No.: 09/794,860

(22) Filed: Feb. 27, 2001

(65) Prior Publication Data
US 2002/0010770 A1 Jan. 24, 2002

(30) Foreign Application Priority Data

Jul. 18, 2000 (JP) ........................................ 2000-217344

(51) Int. Cl.$^7$ ............................................. G06F 15/173
(52) U.S. Cl. ...................... 709/223; 709/224; 709/226; 709/229; 709/232
(58) Field of Search ................................ 709/223, 224, 709/226, 229, 232, 200–253; 714/4

(56) References Cited

U.S. PATENT DOCUMENTS 5,299,207 A * 3/1994 Fujii ........................... 714/45

6,266,694 B1 * 7/2001 Duguay et al. ............. 709/223
6,633,544 B1 * 10/2003 Rexford et al. ............. 370/238
6,643,254 B1 * 11/2003 Kajitani et al. ............. 370/217

FOREIGN PATENT DOCUMENTS

| JP | 05-003475 | 1/1993 |
| JP | 05-003489 | 1/1993 |
| JP | 05-292125 | 11/1993 |
| JP | 06-104894 | 4/1994 |

* cited by examiner

Primary Examiner—Nabil El-Hady
(74) Attorney, Agent, or Firm—Katten Muchin Zavis Rosenman

(57) ABSTRACT

In a network management system performing a fault management process in a hierarchical network, an upper layer fault manager performs a fault management of an upper layer of a hierarchical network, a lower layer fault manager performs a fault management of a lower layer of the network, an inter-layer node connecting information storage portion manages connecting information between packet switching nodes composing the upper layer and link offering nodes composing the lower layer, and an inter-layer fault notifying portion notifies the upper layer fault manager, upon receiving a notification of a link fault which has occurred on a link between the link offering nodes from the lower layer fault manager, that the packet switching nodes affected by the fault are faulted, based on the connecting information.

9 Claims, 13 Drawing Sheets

FIG.4

| L2 NODE | L3 NODE |
|---|---|
| SW1/port1 | RT1/port1 |
| SW1/port2 | RT1/port2 |
| SW2/port1 | RT2/port1 |
| SW2/port2 | RT2/port2 |
| SW3/port1 | RT3/port1 |
| SW3/port2 | RT3/port2 |

FIG.6

| FAULTED LINK NAME | L3 NODE |
|---|---|
| LK1 | RT1/port1 |
| LK3 | RT1/port2 |
| LK1 | RT2/port1 |
| LK2 | RT2/port2 |
| LK2 | RT3/port1 |
| LK3 | RT3/port2 |

FIG.7

| FAULTED LINK NAME | SETTING NODE |
|---|---|
| LK1 | RT3 |
| LK2 | RT1 |
| LK3 | RT2 |

FIG.8

| FAULTED LINK NAME | SETTING NODE |
|---|---|
| LK1 | RT3 |
| LK2 | RT1 |
| LK3 | RT2,RT3 |

NETWORK NW

| LINK NAME | ALTERNATE ROUTE SETTING |
|---|---|
| LK1 | YES |
| LK2 | NO |
| LK3 | NO |

NETWORK MANAGEMENT SYSTEM UTILIZING NOTIFICATION BETWEEN FAULT MANAGER FOR PACKET SWITCHING NODES OF THE HIGHER-ORDER NETWORK LAYER AND FAULT MANAGER FOR LINK OFFERING NODES OF THE LOWER-ORDER NETWORK LAYER

BACKGROUND OF THE INVENTION

1. Field of the Invention

The present invention relates to a network management system, and in particular to a network management system performing a fault management process in a hierarchical network.

2. Description of the Related Art

A fault restoration process in a prior art hierarchical (layered) network management system is performed closed in each layer, in many cases. Specifically, in an Internet Protocol (IP) network which has been used increasingly in recent years, a method of performing an independent fault management in each layer is generally known due to a historical background that management entities or managers for an IP layer and a lower layer thereof are different.

FIG. 11 shows a schematic diagram of the prior art network management system. ATM switches SW1–SW3 composing a lower layer L2 of a hierarchical network NW, which is an IP network, are respectively connected to routers RT1–RT3 composing an upper layer L3.

The ATM switches SW1–SW3 are mutually connected with information lines for passing user data. The ATM switches SW1–SW3 are connected to an L2 fault manager 200 with control lines (indicated by dotted lines) for notifying fault information apart from these information lines.

Also, a computer 10 is connected to the router RT1, computers 21 and 22 are connected to the router RT2, and a computer 30 and an L3 fault manager 100 are connected to the router RT3.

In FIG. 11, because of no cooperative function between the L3 fault manager 100 and the L2 fault manager 200, an individual layer fault management is respectively performed.

Generally, in a fault management method of an IP layer (upper layer), connection confirmation data packets are periodically exchanged between packet switching nodes over the network so that if the connection confirmation data packets are not received within a fixed number of trials, it is determined that there is a fault at the other node or a link fault toward the other node. The fault is dealt with by selecting another route (next node) for transmitting the data packets.

Moreover, in case the packet switching node performs a packet transmission according to a quality policy such as a priority, the fault manager of the IP layer which has received fault information from a certain packet switching node extracts a packet switching node on an alternate route (hereinafter referred to as an alternate node), and resets the priority to each alternate node to realize an end-to-end priority process.

This operation will be specifically described referring to FIG. 12.

FIG. 12 shows a fault management in the upper layer L3 as a performance example of the above-mentioned independent layer fault management. In FIG. 12, the routers RT1–RT3 are the packet switching nodes composing the upper layer L3 of the network NW. The L3 fault manager 100 which performs the fault management of this upper layer L3 is composed of a fault detector 101, a node setting portion 102, a fault process determining portion 103, an L3 connecting information storage portion 104, and a priority information storage portion 105.

The routers RT1–RT3 are mutually exchanging connection confirmation data packets periodically. For example, if a fault occurs between the routers RT1 and RT2 as shown in FIG. 12, the following processes (1)–(5) are performed:

(1) Since the exchange of the connection confirmation data packets between the routers RT1 and RT2 is disabled, the router RT1 or RT2 detects the fault (it is assumed in the following description that the router RT1 detects the occurrence of the fault). Simultaneously with the fault detection, the router RT1 starts alternate routing the data to the router RT3.

(2) The router RT1 notifies the L3 layer fault manager 100 of a trap (i.e. fault information).

(3) In the L3 fault manager 100, the following processes are performed:

(3-1) The fault notification is received from the router RT1 at the fault detector 101. Based on the contents of the fault notification, the fault process determining portion 103 refers to the L3 connecting information storage portion 104 to extract the node RT3 on the alternate route.

(3-2) The fault process determining portion 103 compares the settings of the routers RT1 and RT3, and determines that a quality policy is unset in the router RT3.

(3-3) The fault process determining portion 103 extracts priority information required to be set in the router RT3 from the priority information storage portion 105, and instructs the node setting portion 102 to set the priority information in the router RT3.

In order to describe the contents of the L3 connecting information storage portion 104, a connection state of the upper layer L3 in the network NW of FIG. 11 is shown in FIG. 13, in which the routers RT1–RT3 are mutually connected with virtual links VL1–VL3.

In the L3 connecting information storage portion 104, the connection (virtual link) between the routers RT1 and RT2 is stored, in the form of data, as the virtual link VL1 from a port 1 of the router RT1 (RT1/port1) to a port 1 of the router RT2 (RT2/port1).

In the same way, the virtual links VL2 and VL3 are respectively stored as the virtual link from a port 2 of the router RT2 (RT2/port2) to a port 1 of the router RT3 (RT3/port1), and the virtual link from a port 2 of the router RT1 (RT1/port2) to a port 2 of the router RT3 (RT3/port2).

It is to be noted that the L2 fault manager 200 also performs a management similar to the L3 fault manager 100, and includes L2 connecting information storage portion 204 corresponding to the L3 connecting information storage portion 104. However, since the priority setting is performed only in the upper layer L3, the L2 fault manager 200 is not provided with a portion corresponding to the priority information storage portion 105.

This will be described referring to FIG. 14 which shows only the lower layer L2 in the network NW of FIG. 11. It is to be noted that in FIG. 14, the ATM switches SW1–SW3 are mutually connected with links LK1–LK3.

The L2 connecting information storage portion 204 stores the connection (link) between the ATM switches SW1 and SW2 as the link LK1 from a port 1 of the ATM switch SW1 (SW1/port1) to a port 1 of the ATM switch SW2 (SW2/port1).

In the same way, the links LK2 and LK3 are respectively stored as the link from a port 2 of ATM switch SW2 (SW2/port2) to a port 1 of the ATM switch SW3 (SW3/port1), and the link from a port 2 of the ATM switch SW1 (SW1/port2) to a port 2 of the ATM switch SW3 (SW3/port2).

It is to be noted that the L2 fault manager 200 differs from the L3 fault manager 100 connected to the routers RT1–RT3 with the information lines for passing the user data in that the L2 fault manager 200 is connected to the ATM switches SW1–SW3 with the control lines (indicated by dotted lines) apart from the information lines for passing the user data. Therefore, it is made possible to separately manage the fault of the ATM switch itself and the link fault.

FIG. 15 shows an upper layer L3 as a network state before the fault occurrence in the network of FIG. 11. In this case, it is assumed that the priority information as the quality policy is set in the routers RT1 and RT2 so that data from the computer 10 addressed to the computer 21 are transmitted with a high priority while data from the computer 10 addressed to the computer 22 are transmitted with a low priority. However, this quality policy (priority information) is not set in the router RT3.

A case where a fault occurs on the link LK1 in FIGS. 11 and 14 will now be considered. The link LK1 offers a physical link between the ATM switches SW1 and SW2 respectively connected to the routers RT1 and RT2. The occurrence of a fault on this link LK1 will lead to the fault of the virtual link VL1 shown in FIG. 15.

The fault of the link LK1 is immediately notified to the L2 fault manager 200. However, because of no cooperative function between the L2 fault manager 200 and the L3 fault manager 100, the L3 fault manager 100 cannot detect the fault of the virtual link VL1 until the fault notification is received from the router RT1 or RT2 by the above-mentioned general fault management method in the IP network. Therefore, it takes time from the occurrence of the fault on the link LK1 to the fault detection by L3 fault manager 100.

This will be described referring to FIG. 16.

FIG. 16 shows a network state in case a fault occurs after the state of FIG. 15. The router RT1 starts alternate routing to the router RT3 simultaneously with a fault detection (see FIG. 16(1)), and notifies to the L3 fault manager 100 that a fault has occurred at the RT1/port1 (see FIG. 16(2)).

However, since the quality policy is not set in the router RT3, it is not possible to provide the service according to the determined quality policy for the data packets passing through the router RT3 until the L3 fault manager 100 re-sets the quality policy in the router RT3 (see FIG. 16(3)).

It may be considered to make the router RT1 store (buffer) the data packets until the quality policy setting in the router RT3 is completed as a measure to observe the quality policy. However, since the disconnected time is prolonged in this case, the deterioration of the communication quality over the entire network cannot be avoided.

SUMMARY OF THE INVENTION

It is an object of the present invention to provide a network management system which is able to shorten a time required up to detecting a fault after the occurrence of the fault and to reduce a network communication quality deterioration in a network management system performing a fault restoration process in a hierarchical network.

For the achievement of the above object, the network management system according to claim 1 comprises, as shown in FIG. 1, an L3 fault manager 100, which is an upper layer fault manager, for performing a fault management of an upper layer L3 of a hierarchical network NW, an L2 fault manager 200, which is a lower layer fault manager, for performing a fault management of a lower layer L2 of the network NW, an inter-layer node connecting information storage portion 300 for managing connecting information between packet switching nodes RT1–RT3 composing the upper layer L3 and link offering nodes SW1–SW3 composing the lower layer L2, and an inter-layer fault notifying portion 400 for notifying the upper layer fault manager 100, upon receiving a notification of a link fault which has occurred on a link between the link offering nodes from the lower layer fault manager, that the packet switching nodes affected by the fault are faulted, based on the connecting information.

Namely, for example, if a link fault occurs on a link LK1 between the link offering nodes SW1 and SW2 of the lower layer L2 in FIG. 1, the inter-layer fault notifying portion 400 receives the notification of the link fault from the L2 fault manager 200, and notifies the L3 fault manager 100 that the packet switching nodes affected by the fault (i.e. the routers RT1 and RT2) are faulted, based on the connecting information stored in the inter-layer node connecting information storage portion 300.

As a result, a cooperative function of the fault management between the lower layer L2 and the upper layer L3 can be established so that it is made possible to shorten the time required up to the fault detection in the upper layer after the fault occurrence in the lower layer compared with the prior art network management system where the upper layer L3 detects the fault independently of the lower layer L2.

Also, according to claim 2, the inter-layer fault notifying portion 400 in the present invention of claim 1 shown in FIG. 1 may retrieve the link offering nodes affected by the link fault from lower layer connecting information stored in an L2 connecting information storage portion 204 provided in the L2 fault manager 200, and may recognize the packet switching nodes affected by the link fault by retrieving the information of the inter-layer node connecting information storage portion 300 with the affected link offering nodes.

In FIG. 1, the L3 fault manager 100 and the L2 fault manager 200 have the same arrangements as those in the prior art, and are respectively composed of, for example, fault detectors 101 and 201, node setting portions 102 and 202, fault process determining portions 103 and 203, and connecting information storage portions 104 and 204 as in FIG. 12. The L3 fault manager 100 further includes a priority information storage portion 105.

Also, the links LK1–LK3 and the link offering nodes (i.e. the ATM switches SW1–SW3) at the opposite ends of the links are associated by the L2 connecting information storage portion 204 included in the L2 fault manager 200, and the link offering nodes and the packet switching nodes (i.e. the routers RT1–RT3) are associated or made corresponding to each other by the inter-layer node connecting information storage portion 300.

Namely, in order to recognize, for example, that the packet switching nodes affected by the fault of the link LK1 are the routers RT1 and RT2, the inter-layer fault notifying portion 400 firstly refers to the L2 connecting information storage portion 204 included in the L2 fault manager 200.

Then, after retrieving the link offering nodes (i.e. the ATM switches SW1 and SW2) at the opposite ends of the link LK1, the inter-layer fault notifying portion 400 retrieves the routers RT1 and RT2 from the inter-layer node connecting information storage portion 300.

Thus, the inter-layer fault notifying portion 400 can retrieve the information of the inter-layer node connecting information storage portion 300 using the L2 connecting information stored in the L2 connecting information storage portion 204.

Also, according to claim 3, the present invention according to claim 2 may further comprise an affected node information storage portion for preliminarily associating each link with the packet switching nodes affected by the link fault based on respectively stored information of the lower layer connecting information storage portion and the inter-layer node connecting information storage portion, and the inter-layer fault notifying portion may extract the packet switching nodes affected by the link fault from the affected node information storage portion without using the respectively stored information of the lower layer connecting information storage portion and the inter-layer node connecting information storage portion.

Each link and the packet switching nodes affected by the fault of the link can be preliminarily associated using the L2 connecting information storage portion 204 and the inter-layer node connecting information storage portion 300 shown in FIG. 1 whereby the affected node information storage portion 500 can be added to the arrangement of FIG. 1 instead of the L2 connecting information storage portion 204 and the inter-layer node connecting information storage portion 300.

Namely, in FIG. 2, by providing the affected node information storage portion 500, when the inter-layer fault notifying portion 400 receives the link fault from the L2 fault manager 200, the packet switching node affected by the link fault can be extracted directly from the affected node information storage portion 500 without referring to the L2 connecting information storage portion 204 and the inter-layer node connecting information storage portion 300.

Therefore, the packet switching nodes affected by the link fault can be notified promptly to the L3 fault manager 100.

Also, according to claim 4, the present invention of claim 1 may further comprise an alternate route information storage portion where each link is associated with a packet switching node on an alternate route at a time of the link fault, and the inter-layer fault notifying portion may instruct the upper layer fault manager to set predetermined information related to a communication quality to the packet switching node on the alternate route extracted from the alternate route information storage portion at the time of the link fault.

Namely, instead of the affected node information storage portion 500 of FIG. 2, an alternate route information storage portion 600 is provided, as shown in FIG. 3, which associates each link with the packet switching node (alternate node) on the alternate route at the time of the link fault.

In this case, the inter-layer fault notifying portion 400 can extract the alternate node from the alternate route information storage portion 600 and instruct the L3 fault manager 100 to set the predetermined information related to the communication quality to the alternate node.

As a result, it is . made possible to immediately perform the predetermined setting related to the communication quality to the packet switching node on the alternate route according to the link fault in the lower layer.

Therefore, it is made possible to shorten the period when the communication quality is not maintained because the predetermined setting related to the communication quality is not set in the packet switching node on the alternate route so that the deterioration of the communication quality of the network can be reduced.

Also, according to claim 5, when a fault occurs in the lower layer in the present invention of claim 1, the inter-layer fault notifying portion does not necessarily notify the upper layer fault manager of the fault in case an alternate routing at a link offering node in the lower layer is performed.

Namely, even if the fault occurs in the lower layer, when performing the alternate routing at the link offering node in the lower layer to prevent the upper layer from being affected by the fault, the inter-layer fault notifying portion need not notify the fault to the upper layer fault manager.

Thus, an unnecessary fault notification can be avoided so that the fault management cooperation between the lower layer L2 and the upper layer L3 can be performed more promptly.

Also, in claim 4, the predetermined information may comprise priority information.

Thus, it is made possible to shorten the period when the required priority information is not set in the alternate node at the time of the fault occurrence when the priority process is performed in the upper layer and to reduce the deterioration of the communication quality of the network.

Also, in claim 4, the predetermined information may comprise bandwidth guaranteeing information.

Thus, it is made possible to shorten the period when the required bandwidth guaranteeing information is not set in the alternate node at the time of the fault occurrence when the bandwidth guarantee is performed in the upper layer, and to reduce the deterioration of the communication quality of the network.

Also, in claim 4, when a plurality of alternate routes exist for an arbitrary link, the alternate route information storage portion may store a shortest alternate route where a hop count becomes minimum in correspondence with the link.

Namely, when a plurality of alternate routes exist for an arbitrary link, the alternate route information storage portion can preliminarily calculate the shortest alternate route where the hop count becomes minimum to store only the shortest alternate route associated with the link.

Thus, the alternate route at the time of the link fault occurrence can always be the shortest route.

In this case, the shortest alternate route may be obtained using a Dijkstra algorithm.

BRIEF DESCRIPTION OF THE DRAWINGS

FIG. 4 is a diagram illustrating an,example of an inter-layer node connecting information table stored in an inter-layer node connecting information storage portion of a network management system according to the present invention;

FIG. 6 is a diagram illustrating an example of a link-affected node correspondence table stored in an affected node information storage portion of a network management system according to the present invention;

FIG. 7 is a diagram illustrating a link-setting node correspondence table (1) stored in an alternate route information storage portion of a network management system according to the present invention;

FIG. 8 is a diagram illustrating a link-setting node correspondence table (2) stored in an alternate route information storage portion of a network management system according to the present invention;

Throughout the figures, like reference numerals indicate like or corresponding components.

DESCRIPTION OF THE EMBODIMENTS

Figure 1:
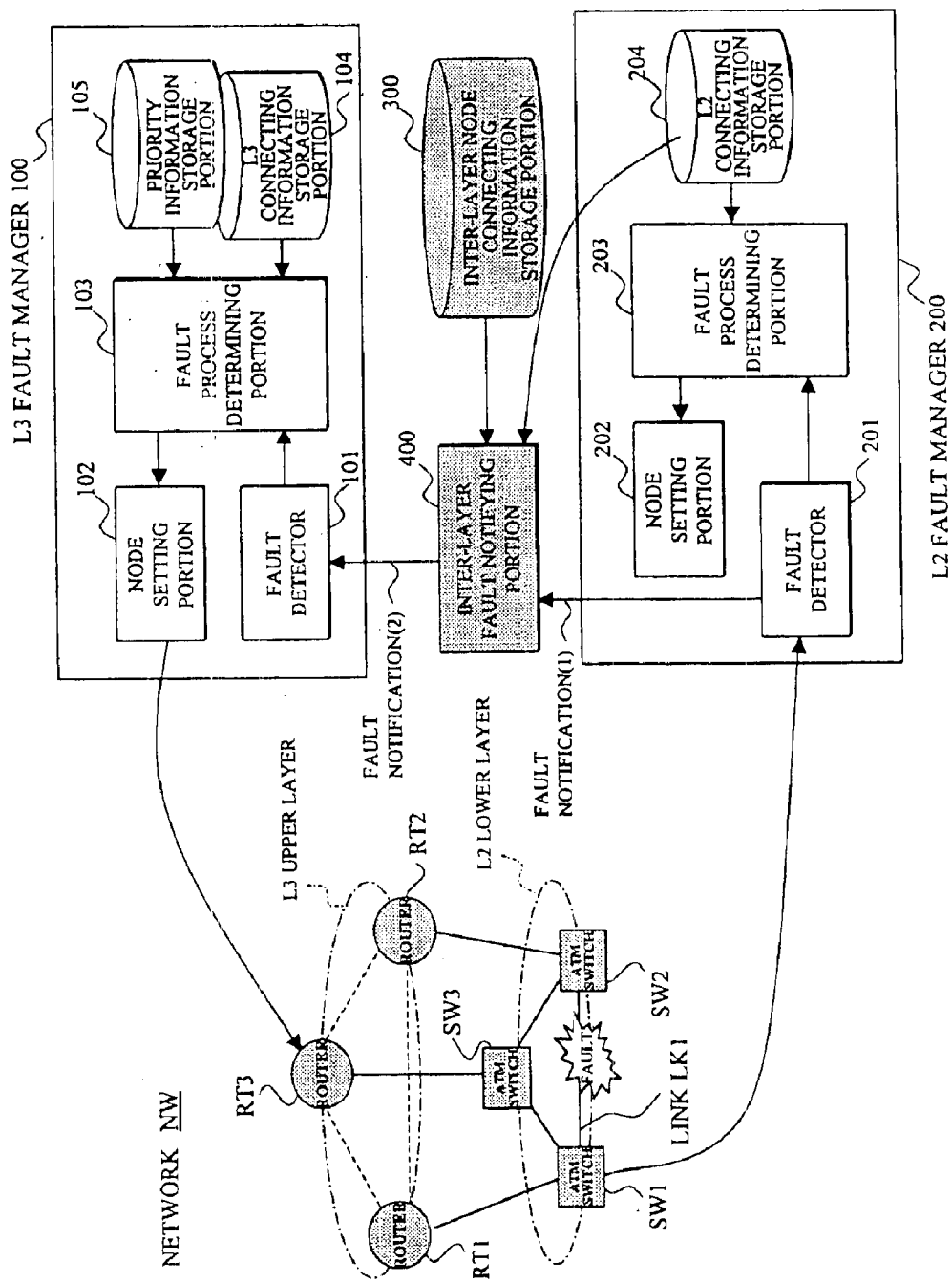
FIG. 1 is a block diagram illustrating a schematic arrangement (1) of a network management system according to the present invention.

FIG. 4 shows an embodiment of the connecting information of the nodes of the lower layer L2 (L2 nodes) and the upper layer L3 (L3 nodes) stored in the inter-layer node connecting information storage portion 300 in the network management system according to the present invention schematically shown in FIG. 1. For example, in FIG. 4, the SW1/port1 of the L2 node is associated with or made corresponding to the RT1/port1 of the L3 node in the form of a table.

An operational embodiment when using such an inter-layer node connecting information storage portion 300 will be described herebelow referring to FIG. 5.

Figure 5:
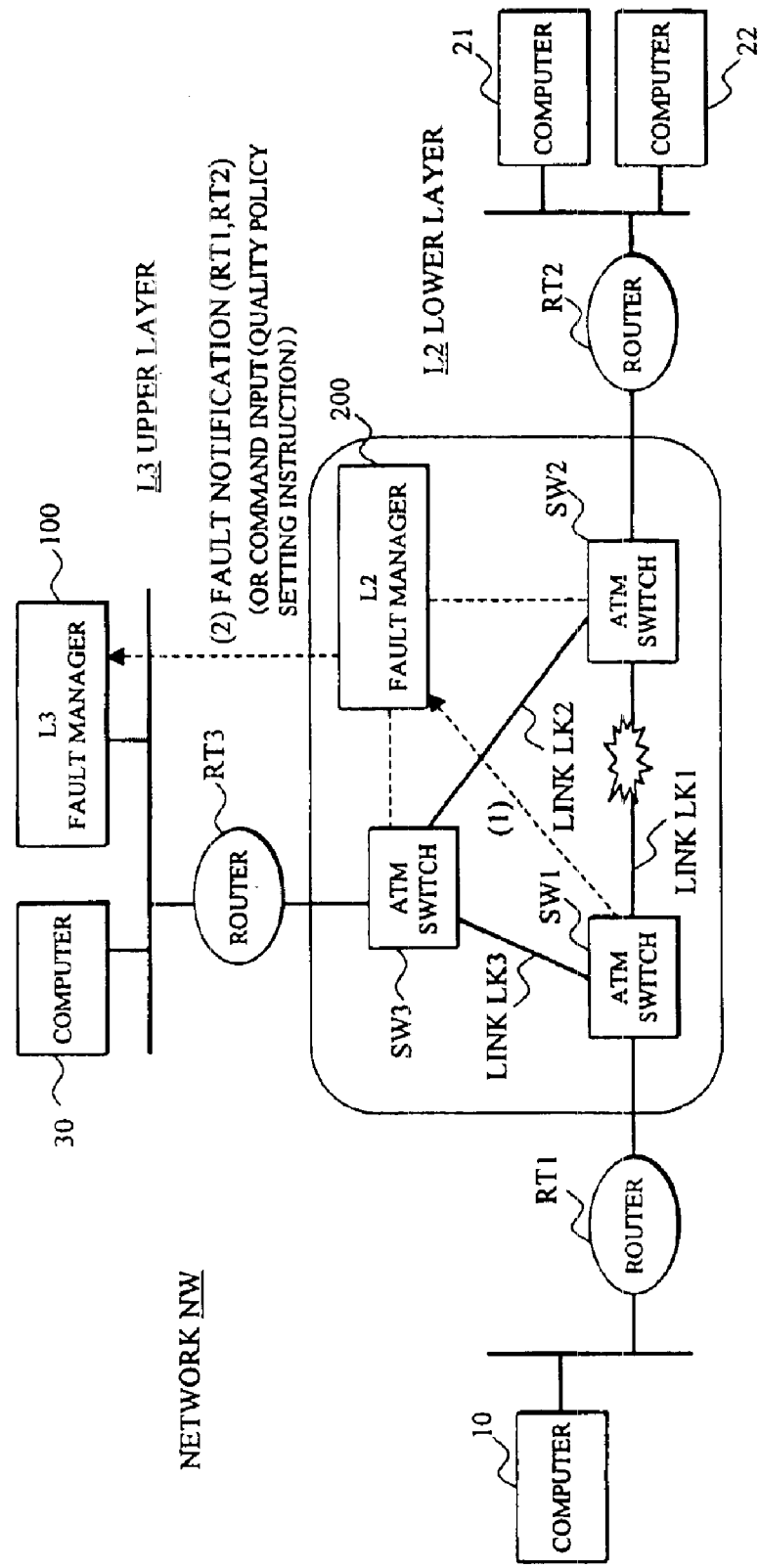
FIG. 5 is a block diagram illustrating an operational embodiment of a network management system according to the present invention.
Figure 11:
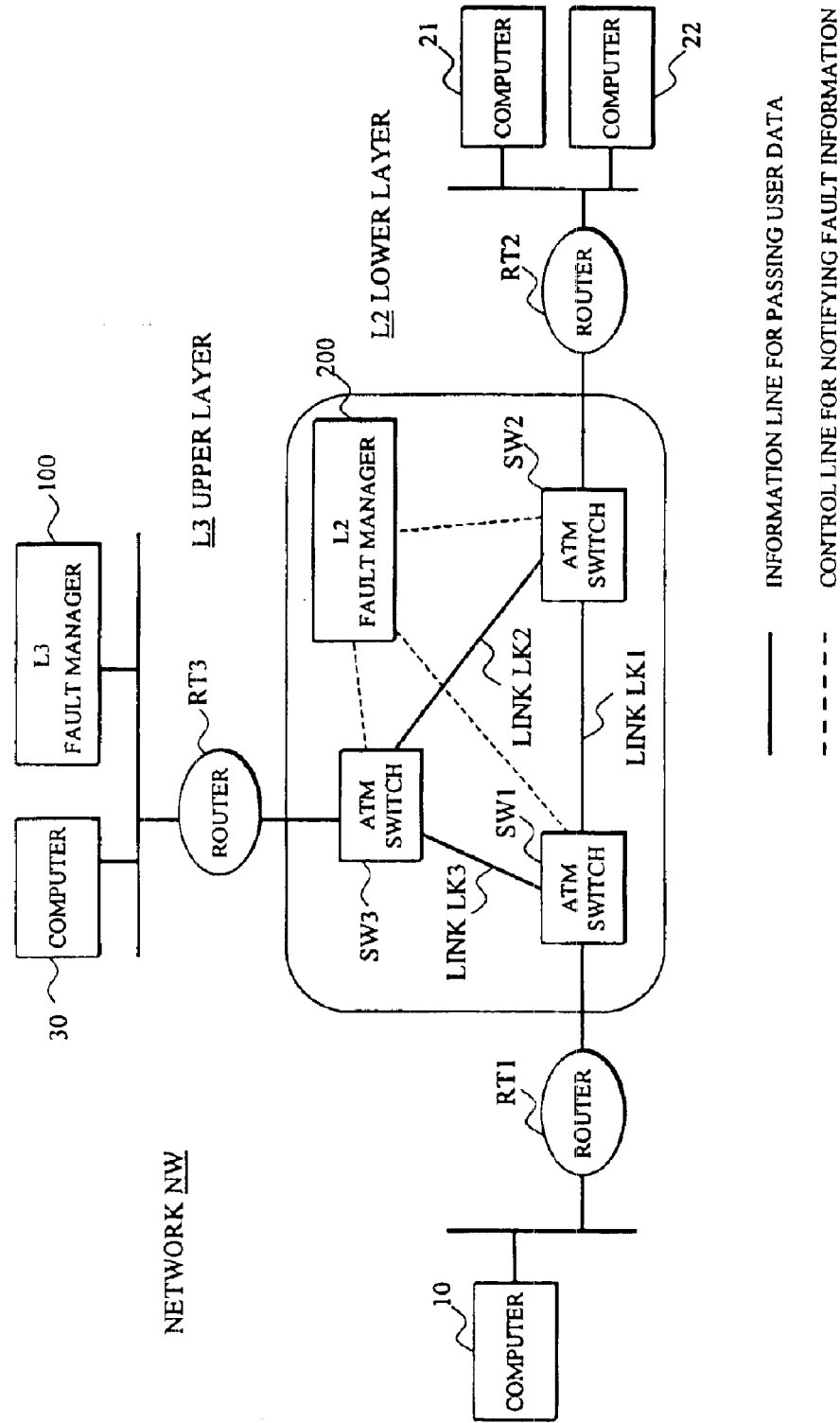
FIG. 11 is a block diagram illustrating a prior art network management system.

Firstly, the arrangement of the hierarchical network NW in FIG. 5 is basically the same as that of the network NW shown in FIG. 11.

Namely, the ATM switches SW1–SW3 composing the lower layer L2 are respectively connected to the routers RT1–RT3 composing the upper layer L3.

Also, the computer 10 is connected to the router RT1, the computers 21 and 22 are connected to the router RT2, and the computer 30 and the L3 fault manager 100 are connected to the router RT3.

Moreover, the L2 fault manager 200 is connected to the ATM switches SW1–SW3.

It is to be noted that the arrangements of the L3 fault manager 100 and the L2 fault manager 200 are the same as that shown in FIG. 1.

While the inter-layer fault notifying portion 400 and the inter-layer node connecting information storage portion 300 shown in FIG. 1 are illustrated as not being included in the L3 fault manager 100 and the L2 fault manager 200, it is assumed in this embodiment that they are included in the L2 fault manager 200.

Figure 12:
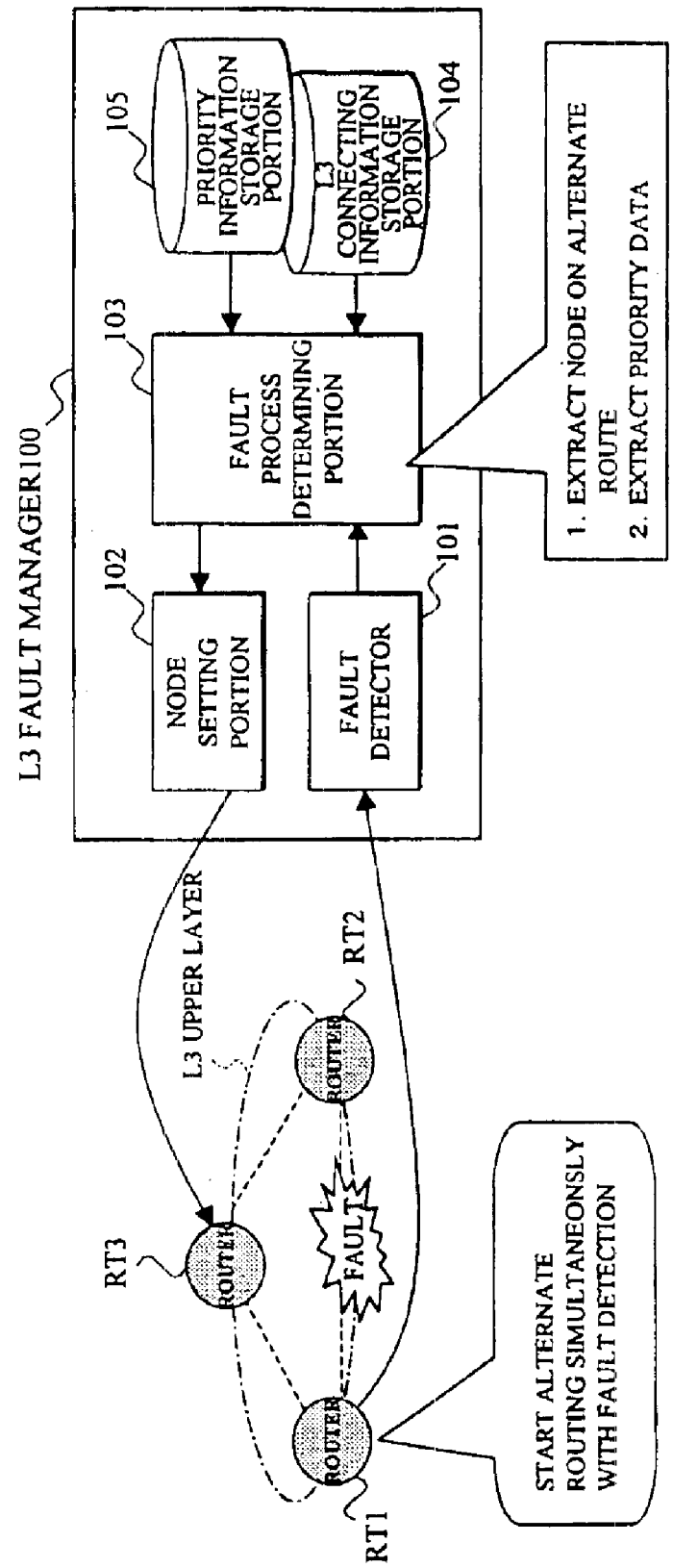
FIG. 12 is a block diagram for describing an operation of a prior art fault manager in an upper layer.
Figure 13:
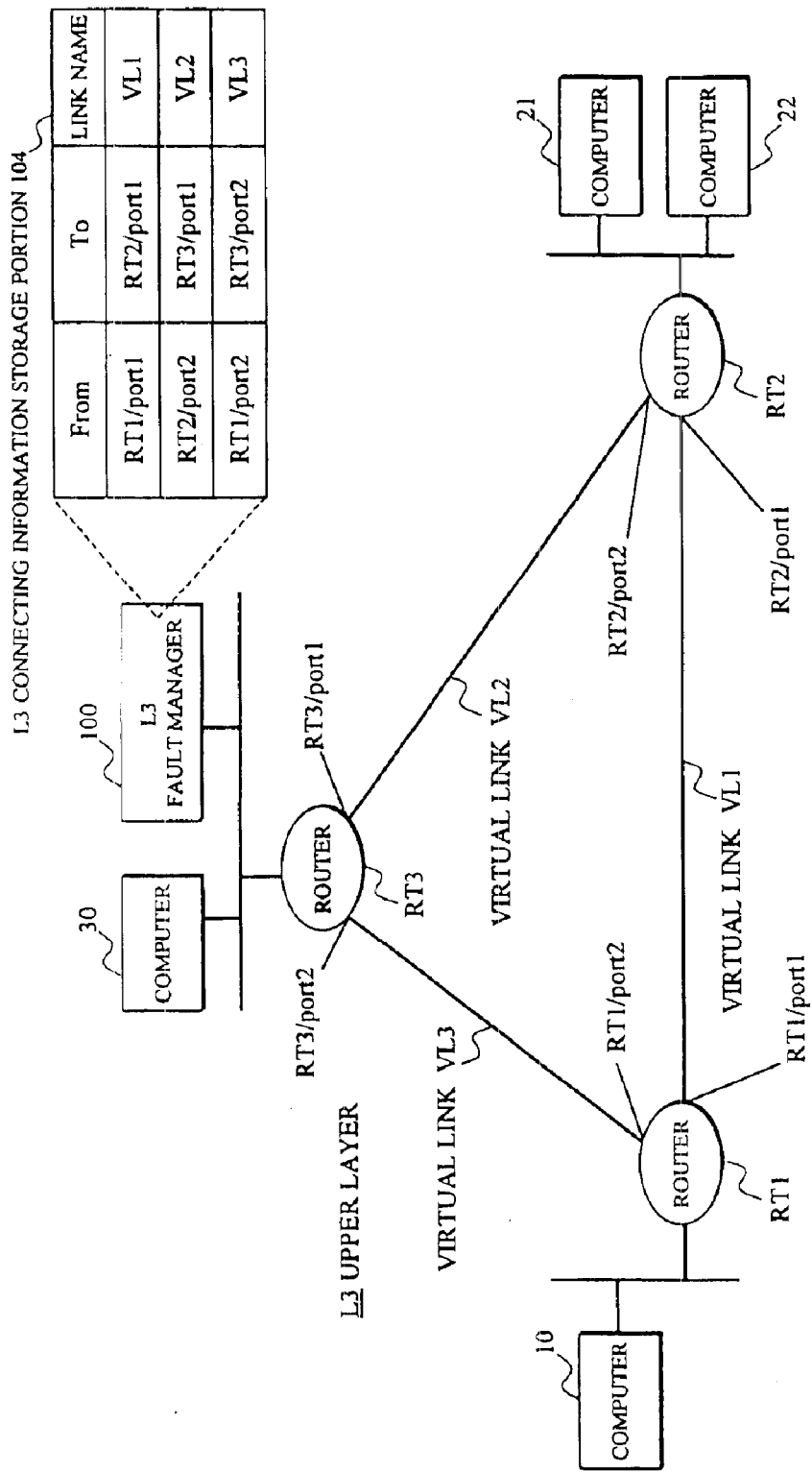
FIG. 13 is a block diagram for describing an operation of a prior art L3 fault manager.

Also, information stored in the L3 connecting information storage portion 104 provided in the L3 fault manager 100 and the L2 connecting information storage portion 204 provided in the L2 fault manager 200 are respectively the same as those shown in FIGS. 12 and 13.

When a fault occurs on the link LK1 as shown in FIG. 5, the ATM switch SW1 notifies the L2 fault manager 200 of the fault of the link LK1 (see FIG. 5(1)).

Figure 14:
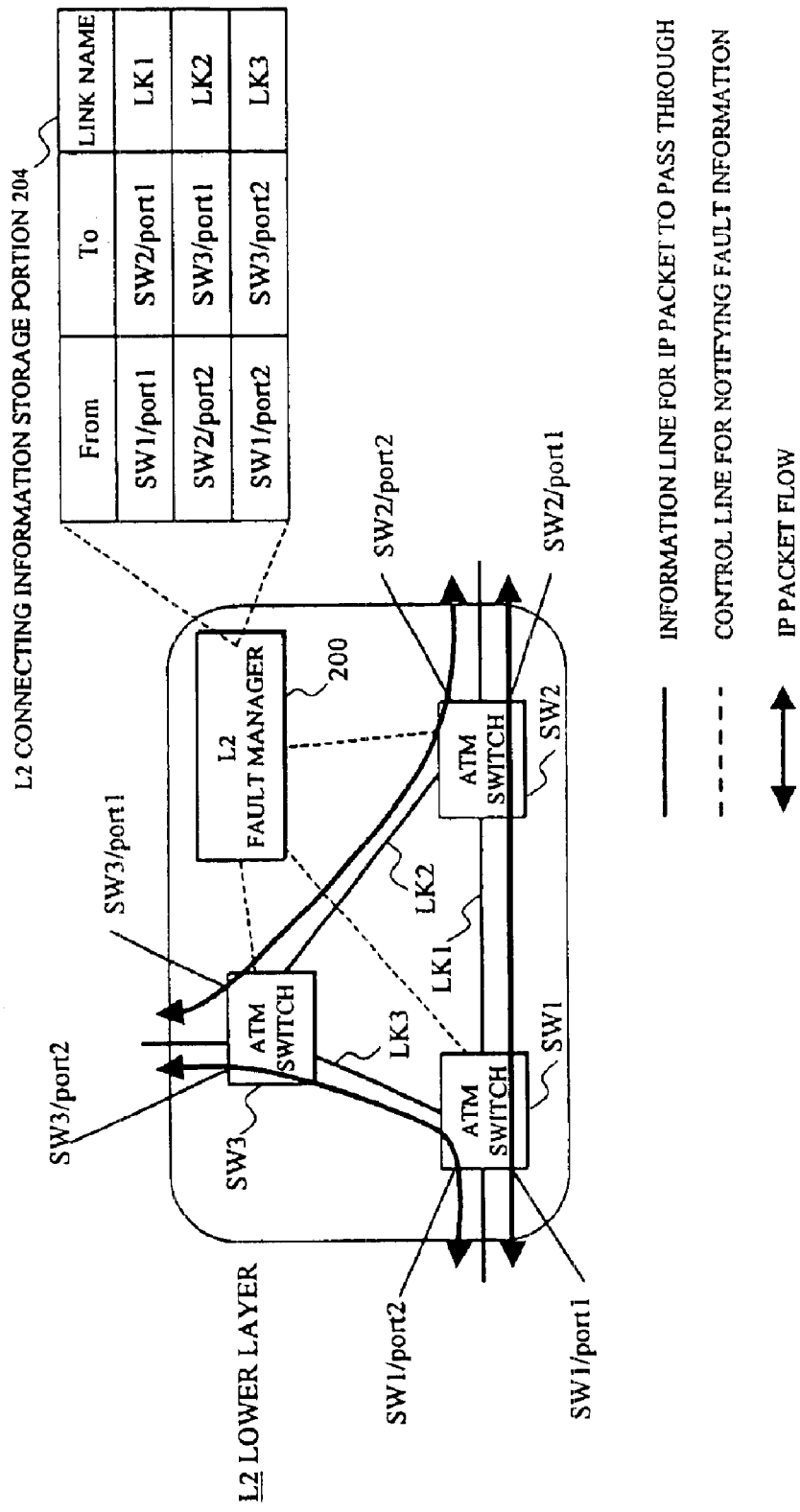
FIG. 14 is a block diagram illustrating a network recognized by a prior art L3 fault manager.
Figure 15:
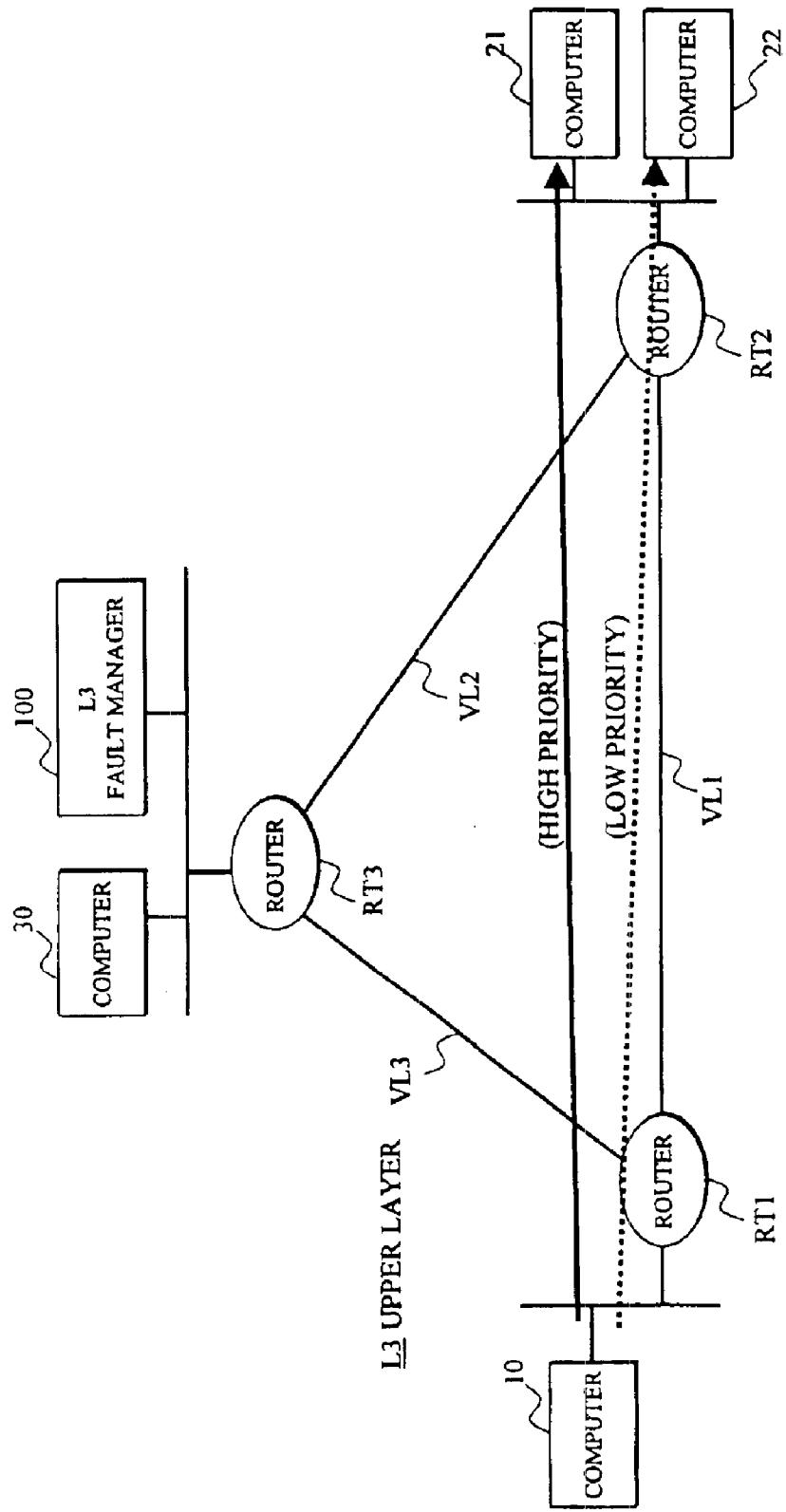
FIG. 15 is a block diagram illustrating a network state before a fault occurrence in a prior art network management system.
Figure 16:
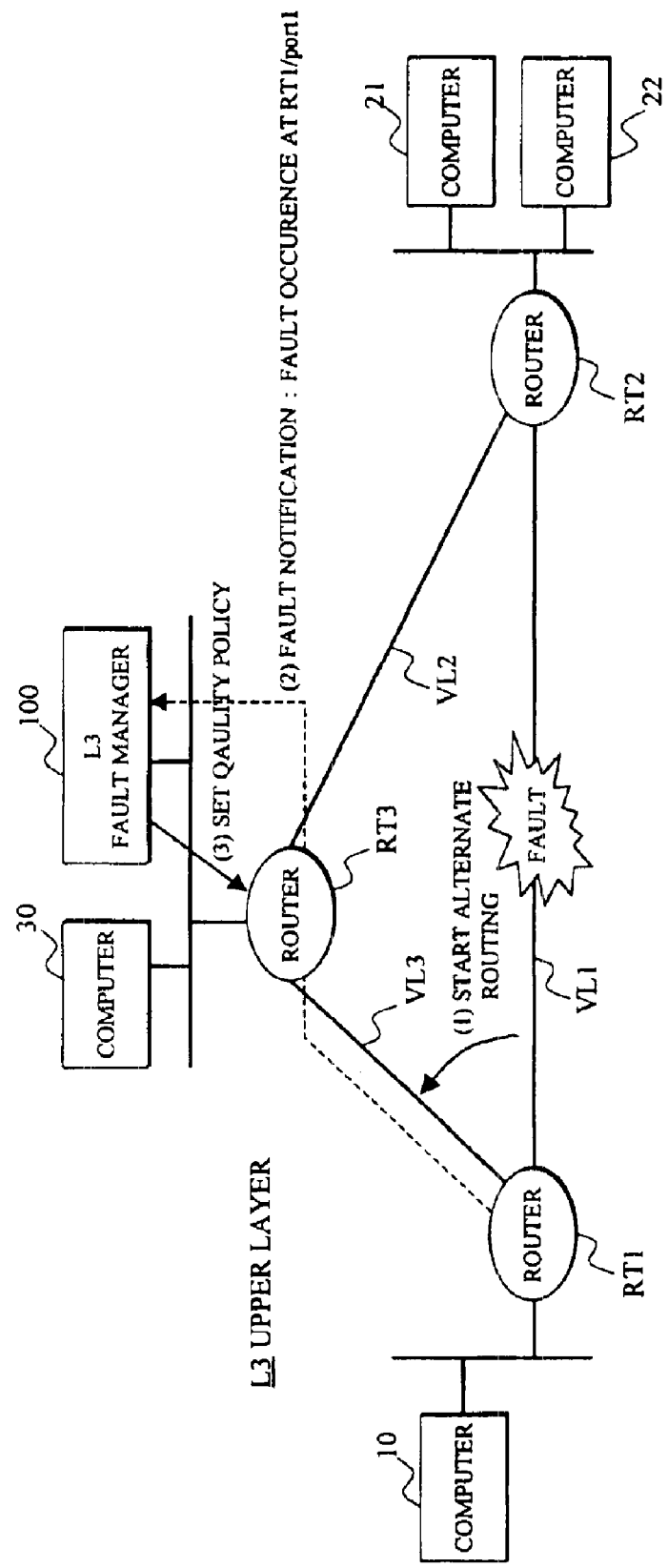
FIG. 16 is a block diagram illustrating a network state at a time of a fault occurrence in a prior art network management system.

The inter-layer fault notifying portion 400 in the L2 fault manager 200 retrieves the L2 connecting information storage portion 204 in the L2 fault manager 200 shown in FIG. 14 with the information of the link LK1 to obtain the SW1/port1 and the SW2/port1 as the information of the nodes at the opposite ends of the link LK1.

Based on this information, the inter-layer fault notifying portion 400 further retrieves the inter-layer node connecting information table shown in FIG. 4 to obtain the RT1/port1 and the RT2/port1 respectively corresponding to the SW1/port1 and the SW2/port1 as information of the affected L3 nodes.

Then, the L2 fault manager 200 notifies the fault of the routers RT1 and RT2 to the L3 fault manager 100 from the inter-layer fault notifying portion 400 (see FIG. 5(2)). The L3 fault manager 100 having received this notification performs a prior art fault restoration process In this case, it is made possible to shorten the time for the router RT1 or RT2 to independently detect the fault in the prior art.

Figure 2:
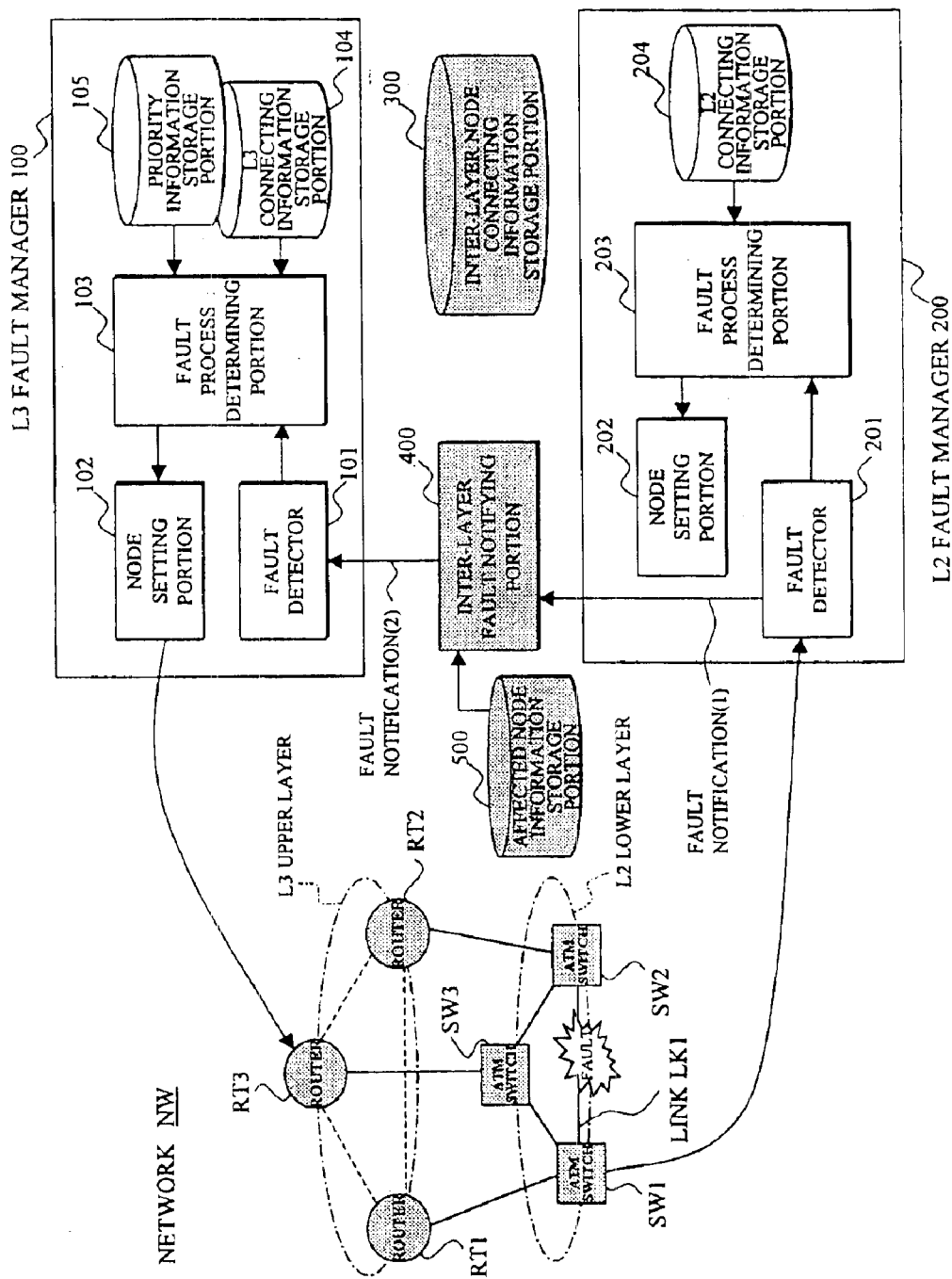
FIG. 2 is a block diagram illustrating a schematic arrangement (2) of a network management system according to the present invention.

FIG. 6 shows an embodiment of a link-affected node correspondence table stored in the affected node information storage portion 500 in the network management system according to the present invention schematically shown in FIG. 2. In this table, each faulted link is preliminarily associated with the affected packet switching nodes (L3 nodes) based on the L2 connecting information shown in FIG. 14 and the information of the inter-layer node connecting information table shown in FIG. 4.

Therefore, for example, the faulted link LK1 is associated with RT1/port1 and RT2/port1 as shown in FIG. 6.

An operational embodiment when using such an affected node information storage portion 500 will be described below, also referring to FIG. 5.

Also in this case, although the affected node information storage portion 500 in FIG. 2 is illustrated as not being included in the L3 fault manager 100 and the L2 fault manager 200, in the same way as the above-mentioned inter-layer fault notifying portion 400 and the interlayer node connecting information storage portion 300, the affected node information storage portion 500 storing the table shown in FIG. 6 is included in the L2 fault manager 200 shown in FIG. 5

Firstly, as for the fault which has occurred on the link LK1, the L2 fault manager 200 receives the fault notification from the ATM switch SW1 (see FIG. 5(1)).

Next, the inter-layer fault notifying portion 400 in the L2 fault manager 200 retrieves only the table of FIG. 6 with the information of the link LK1, recognizes that the affected packet switching nodes are the RT1/port1 and the RT2/port1, and notifies the L3 fault manager 100 of the fault of the routers RT1 and RT2 (see FIG. 5(2)).

Therefore, it is made possible to further shorten the time up to the L3 fault manager 100 receives the fault notification after the occurrence of the link fault.

Figure 3:
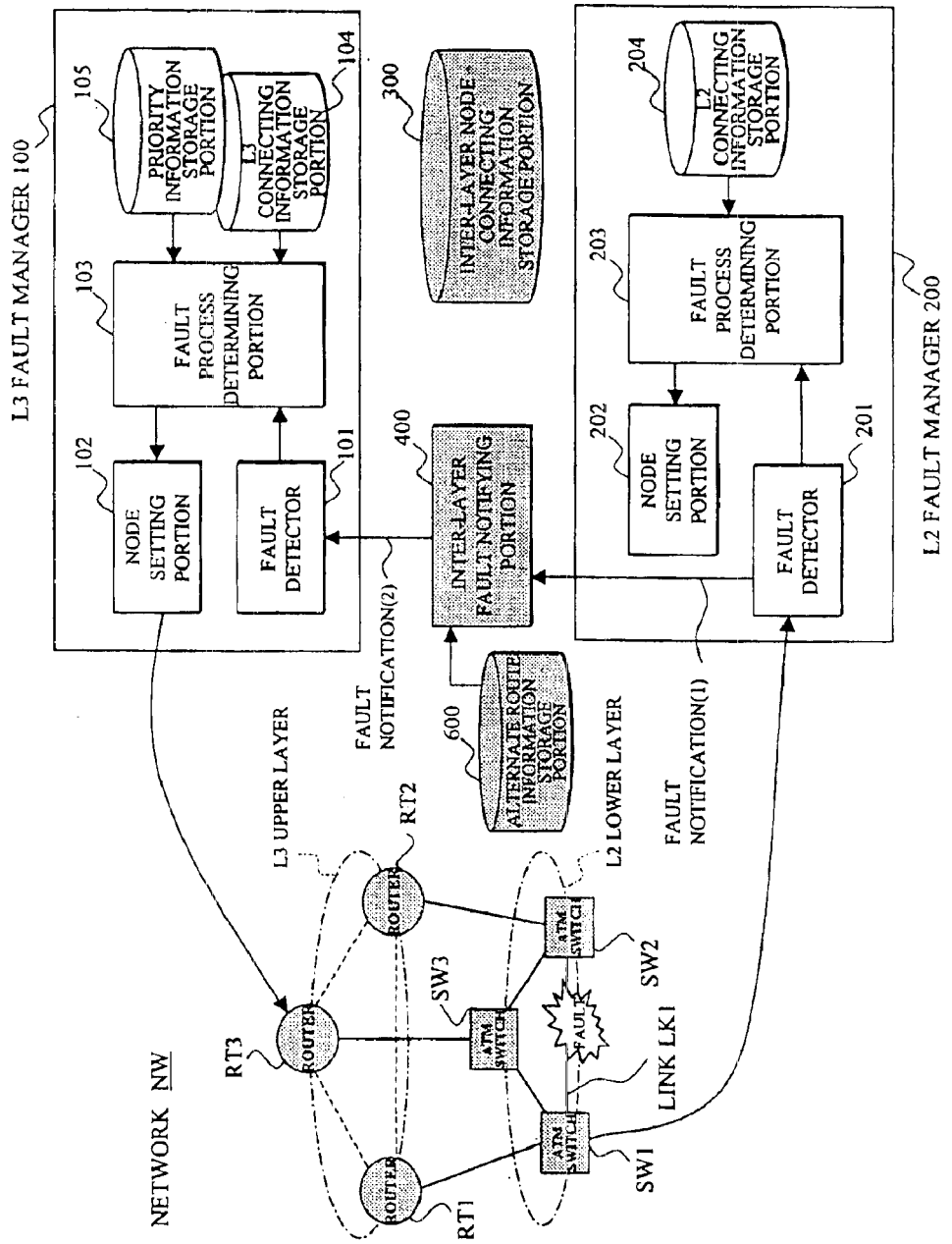
FIG. 3 is a block diagram illustrating a schematic arrangement (3) of a network management system according to the present invention.

FIG. 7 shows an embodiment of a link-setting node correspondence table stored in the alternate route information storage portion 600 in the network management system according to the present invention schematically shown in FIG. 3. This table preliminarily associates the links LK1–LK3 with the alternate nodes (routers RT3, RT1, and RT2, respectively) upon the fault occurrence as the setting node requiring the setting of the quality policy.

The operational embodiment when using such an alternate route information storage portion 600 will be described herebelow, also referring to FIG. 5.

Also in this case, although the alternate route information storage portion 600 in FIG. 3 is illustrated as not being included in the L3 fault manager 100 and the L2 fault manager 200, the alternate route information storage portion 600 storing the table shown in FIG. 7 is assumed to be included in the L2 fault manager 200 shown in FIG. 5, in the same way as the above-mentioned inter-layer fault notifying portion 400, the inter-layer node connecting information storage portion 300, and the affected node information storage portion 500.

Firstly, as for a fault which has occurred on the link LK1, a fault notification is received from the ATM switch SW1 (see FIG. 5(1)).

Next, the inter-layer fault notifying portion 400 in the L2 fault manager 200 recognizes the necessity of the setting of the quality policy to the router RT3, which is set for the alternate route in case of the fault of the link LK1, by retrieving the table of FIG. 7.

Then, the inter-layer fault notifying portion 400 instructs the L3 fault manager 100 by a command input to set the quality policy equivalent to the router RT1 in the router RT3 (see FIG. 5(2)).

In case the quality policy is a priority, i.e. when L3 fault manager 100 includes the priority information storage portion shown in FIG. 1, the priority information equivalent to the router RT1 is set in the router RT3.

In this case, it means that the L2 fault manager 200 plays a role of an administrator to the L3 fault manager 100 concerning the setting of the quality policy. As a result, it is made possible to shorten the time required up to setting the quality policy to the alternate node after the link fault occurrence.

It is to be noted that apart from the priority, the bandwidth guarantee can also be set for the quality policy.

FIG. 8 shows another embodiment of the link-setting node correspondence table stored in the alternate route information storage portion 600 in the network management system according to the present invention schematically shown in FIG. 3.

The table shown in FIG. 8 is different from the table shown in FIG. 7 in that not only the router RT2 but also the router RT3 is associated as the setting node for the faulted link LK3.

Figures 9, 10:
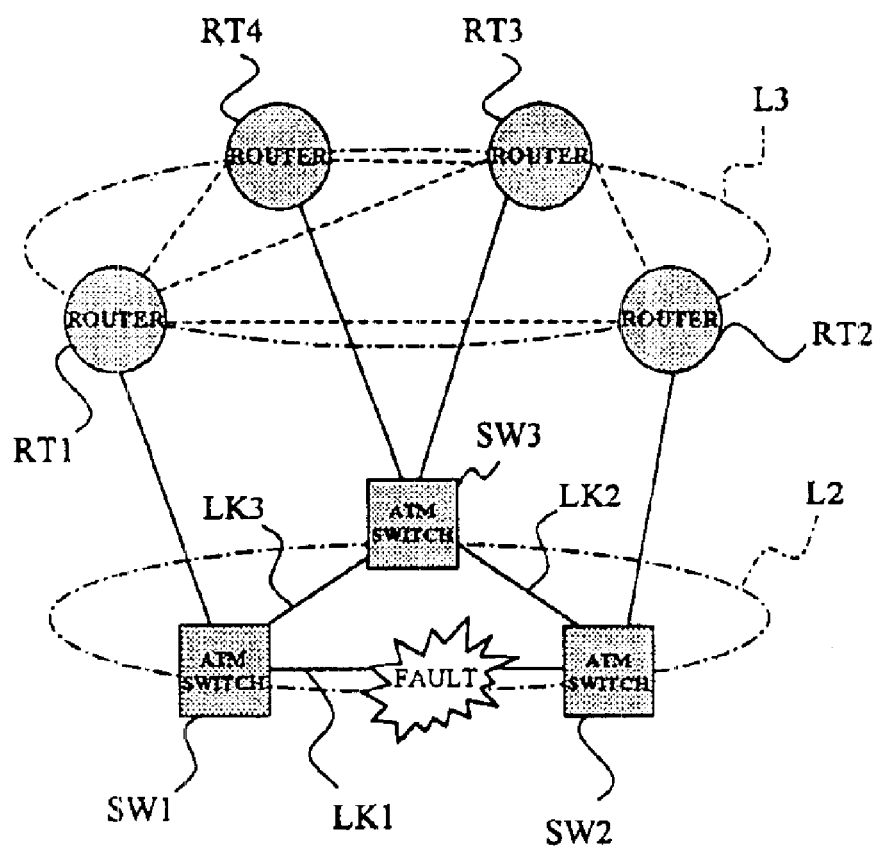
FIG. 9 is a network diagram illustrating an arrangement of a network including an ATM switch connected to two routers.
FIG. 10 is a diagram illustrating an alternate route setting table which stores information of an alternate route setting in a lower layer of a network management system according to the present invention.

This is because the network on which the table shown in FIG. 7 is based has only a single router of the upper layer connected to a single ATM switch of the lower layer, whereas in the network on which the table shown in FIG. 8 is based, the routers RT3 and RT4 are connected to the single ATM switch SW3 as shown in FIG. 9.

As for FIG. 9, when the fault occurs on the link LK1, the alternate routings are required for the affected routers RT1 and RT2. As the alternate routes in this case, "RT1→RT4→RT3→RT2" and "RT1→RT3→RT2" exist, but the route of "RT1→RT3→RT2" has a fewer hop count and assumes the shortest route.

Also, as the alternate routes of the routers RT2 and RT3 affected by the fault of the link LK2, "RT2→RT1→RT4→RT3" and "RT2→RT1→RT3" exist, and "RT2→RT1→RT3" assumes the shortest route.

Thus, when a plurality of alternate routes exist for an arbitrary link, the alternate route information storage portion can be made to store only the node on the shortest route as the setting node.

Also, the routers affected by the fault of the link LK3 are the routers RT1, RT3 and RT4. In this case, the alternate route between RT1 and RT3 is "RT1→RT2→RT3" and the alternate route between RT1 and RT4 is "RT1→RT2→RT3→RT4".

Therefore, in case of the network arrangement shown in FIG. 9, in the link-setting node correspondence table stored in the alternate route information storage portion 600, the setting nodes are the router RT3 in case of the fault on the link LK1, the router RT1 in case of the fault on the link LK2, and the routers RT2 and RT3 in case of the fault on the link LK3 as shown in FIG. 8.

It is to be noted that, for example, a Dijkstra algorithm (E.W.Dijkstra, A note on two problems in connection with graphs, Numer. Math., 1(1959), pp. 269–271) can be used for a method of obtaining the shortest route.

In the description of the above-mentioned embodiments, it is assumed that a fault which has occurred in the lower layer always affects the upper layer. However, for example, the routers RT1 and RT2 are not affected if the alternate routing within the lower layer (SW1→SW3→SW2) is performed when a fault occurs on the link LK1 in FIG. 5.

If information of whether or not to perform such an alternate routing in the lower layer is preliminarily set in an alternate route setting table shown in FIG. 10 and provided, for example, in the L2 fault manager 200 shown in FIG. 3 so as to be referred by the inter-layer fault notifying portion 400 included in the L2 fault manager 200, it is made possible that the fault notification is not given to the L3 fault manager 100 if the notified link is the link LK1 which has the alternate route setting while being given to the L3 fault manager 100 if it is the link LK2 or LK3 which has no alternate route setting.

As described above, the network management system according to the present invention is arranged such that an upper layer fault manager performs a fault management of an upper layer of a hierarchical network, a lower layer fault manager performs a fault management of a lower layer of the network, an inter-layer node connecting information storage portion manages connecting information between packet switching nodes composing the upper layer and link offering nodes composing the lower layer, and an inter-layer fault notifying portion notifies the upper layer fault manager, upon receiving a notification of a link fault which has occurred on a link between the link offering nodes from the lower layer fault manager, that the packet switching nodes affected by the fault are faulted, based on the connecting information. Therefore, it is made possible to shorten a time required up to detecting a fault after occurrence of the fault.

Also, the present invention is arranged such that an alternate route information storage portion associates each link with a packet switching node on an alternate route at a time of the link fault, and the inter-layer fault notifying portion instructs the upper layer fault manager to set predetermined information related to a communication quality to the packet switching node on the alternate route extracted from the alternate route information storage portion at the time of the link fault. Therefore, it is made possible to reduce a network communication quality deterioration.

We claim:

1. A network management system comprising:
   an upper layer fault manager for performing a fault management of an upper layer of a hierarchical network,
   a lower layer fault manager for performing a fault management of a lower layer of the network,
   an inter-layer node connecting information storage portion for managing connecting information between packet switching nodes composing the upper layer and link offering nodes composing the lower layer, and
   an inter-layer fault notifying portion for notifying the upper layer fault manager, upon receiving a notification of a link fault which has occurred on a link between the link offering nodes from the lower layer fault manager, that the packet switching nodes affected by the fault are faulted, based on the connecting information.

2. The network management system as claimed in claim 1 wherein the inter-layer fault notifying portion retrieves the link offering nodes affected by the link fault from lower layer connecting information of a lower layer connecting information storage portion included in the lower layer fault manager, and recognizes the packet switching nodes affected by the link fault by retrieving the information of the inter-layer node connecting information storage portion with the affected link offering nodes.

3. The network management system as claimed in claim 2, further comprising an affected node information storage portion for preliminarily associating each link with the packet switching nodes affected by the link fault based on respectively stored information of the lower layer connecting information storage portion and the inter-layer node connecting information storage portion,
   the inter-layer fault notifying portion extracting the packet switching nodes affected by the link fault from the affected node information storage portion without using the respectively stored information of the lower layer connecting information storage portion and the inter-layer node connecting information storage portion.

4. The network management system as claimed in claim 1, further comprising an alternate route information storage portion where each link is associated with a packet switching node on an alternate route at a time of the link fault,
   the inter-layer fault notifying portion instructing the upper layer fault manager to set predetermined information related to a communication quality to the packet switching node on the alternate route extracted from the alternate route information storage portion at the time of the link fault.

5. The network management system as claimed in claim 1 wherein when a fault occurs in the lower layer, the inter-layer fault notifying portion does not notify the upper layer fault manager of the fault in case an alternate routing at a link offering node in the lower layer is performed.

6. The network management system as claimed in claim 4 wherein the predetermined information comprises priority information.

7. The network management system as claimed in claim 4 wherein the predetermined information comprises bandwidth guaranteeing information.

8. The network management system as claimed in claim 4 wherein when a plurality of alternate routes exist for an arbitrary link, the alternate route information storage portion stores a shortest alternate route where a hop count becomes minimum in correspondence with the link.

9. The network management system as claimed in claim 8 wherein the shortest alternate route is obtained by using a Dijkstra algorithm.

* * * * *